United States Patent [19]

Höhnke

[11] Patent Number: 5,637,114
[45] Date of Patent: Jun. 10, 1997

[54] FABRIC OF HIGH DRAPABILITY, MANUFACTURE THEREOF, USE THEREOF FOR MAKING AIRBAGS, AND AIRBAG MADE THEREOF

[75] Inventor: Gerhard Höhnke, Bobingen, Germany

[73] Assignee: Hoechst Aktiengesellschaft, Germany

[21] Appl. No.: 371,752

[22] Filed: Jan. 12, 1995

[30] Foreign Application Priority Data

Jan. 17, 1994 [DE] Germany ............ 44 01 003.6

[51] Int. Cl.$^6$ ............... D03D 3/00; D06B 1/00; B29D 22/00
[52] U.S. Cl. ............ 8/137; 139/389; 139/420 A; 28/167; 280/728.1; 280/743.1; 428/36.1; 428/902; 442/189; 442/208
[58] Field of Search ............ 8/137, 137.5, 151, 8/151.2, 154, 155; 428/35.2, 224, 36.1, 36.3, 225, 229, 902; 28/167, 165; 139/291 R, 389, 421, 426 TW, 420 A, 387 R; 280/728.1, 743.1

[56] References Cited

U.S. PATENT DOCUMENTS

| | | | |
|---|---|---|---|
| 4,921,735 | 5/1990 | Bloch | 428/34.9 |
| 5,236,775 | 8/1993 | Swoboda et al. | 428/225 |
| 5,356,680 | 10/1994 | Krummheuer et al. | 428/36.1 |
| 5,477,890 | 12/1995 | Krummheuer et al. | 139/291 R |

FOREIGN PATENT DOCUMENTS

| | | |
|---|---|---|
| 2034067 | 7/1991 | Canada . |
| 0 314 867 | 5/1989 | European Pat. Off. . |
| 0 442 373 | 8/1991 | European Pat. Off. . |
| 0 442 373 A1 | 8/1991 | European Pat. Off. . |
| 0 523 546 A1 | 1/1993 | European Pat. Off. . |
| 0 523 546 | 1/1993 | European Pat. Off. . |
| 2 317 991 | 10/1973 | Germany . |
| 40 00 740 | 7/1991 | Germany . |
| 1422447 | 1/1976 | United Kingdom . |

*Primary Examiner*—Alan D. Diamond
*Attorney, Agent, or Firm*—Connolly & Hutz

[57] ABSTRACT

A process for producing uncoated woven fabrics from synthetic yarn for an airbag comprises the steps of: (a) producing a woven fabric from high tenacity polyester filament yarn having a filament linear density of not more than 5 dtex, a yarn linear density within the range from 250 to 550 dtex, a hot air shrinkage at 200° C. of less than 9% and a boil off shrinkage of less than 2%, (b) washing the fabric at temperatures of less than 60° C., and (c) drying the washed fabric at temperatures of less than 170° C. under conditions so that the dimensions of the fabric, based on its dimensions prior to washing, do not change at all or by less than 2% in warp and weft directions. The uncoated fabric obtained by this process is particularly suitable for making airbags and is notable for good drapability.

30 Claims, No Drawings

FABRIC OF HIGH DRAPABILITY, MANUFACTURE THEREOF, USE THEREOF FOR MAKING AIRBAGS, AND AIRBAG MADE THEREOF

DESCRIPTION

The present invention relates to a synthetic yarn fabric which can be used for manufacturing airbags and to a process for producing said fabric.

Airbags are increasingly being used as a safety device in automotive vehicles. An airbag has the function, in the event of danger, of being unfolded, by very rapidly incoming gas, into a balloon which, owing to the high pressure prevailing therein, is capable of absorbing the impact of a body thrown against it effectively yet softly. Thereafter, however, the protective balloon should collapse as rapidly as possible so as not to hinder further actions on the part of the protected person.

An airbag therefore has very precise requirements in terms of the increase and decrease in pressure with time, which are achievable by fitting preset outlet valves into an otherwise gas-impermeable sleeve of the airbag or by making part of its sleeve, the jacket, gastight while the side portions exhibit a controlled level of gas permeability.

Important requirements for the fabric of such an airbag are a controlled air permeability, a low fabric weight and a low thickness (for space-saving accommodation in the automotive vehicle) and a high breaking strength and adequate breaking extension (to absorb the energy of the explosive unfolding of the airbag).

The airbags currently used in the field are made predominantly of a rubberized polyamide fabric, the rubberization ensuring the low level of air permeability. Such a coated fabric is described for example in DE-A-2,317,991.

Rubberizing the polyamide fabric makes the manufacture of the airbag complicated and costly and increases the space required by the folded airbag. Also, because of the rubberization, these polyamide fabrics tend to become brittle, which shortens the life of the airbag.

EP-A-314,867 discloses an uncoated polyamide fabric for an airbag, where the low air permeability is said to be achieved by shrinking, heat setting and calendering the fabric. It is mentioned in this reference that instead of polyamide yarns it is also possible to use yarns made of polyester, aramids, PPS, polyimides and the like. The fabric described therein has a plain weave with 34 470 dtex ends/cm and 16 470 dtex picks/cm. The additional steps of shrinking, heat setting and calendering the fabric make the manufacture of the airbag more costly.

EP-A-523,546 discloses an industrial fabric of controlled air permeability and very good aging resistance, which is said to be particularly suitable for manufacturing airbag fabrics. This fabric aquires its properties only as a result of precisely mutually adapted production conditions in weaving, a specific wet treatment and a hot air treatment. The wet treatment takes place at temperatures from 60° to 140° C., and the hot air treatment is carried out on a tenter with an overfeed of from 3 to 5%. Polyester fabric requires a two-stage heat treatment, drying at 150° C. and subsequently setting at a setting temperature of about 190° C. In the process described therein, polyester fabrics have to be set by a hot air treatment with shrinkage being allowed.

Furthermore, DE-A-4,000,740 discloses a process for producing an uncoated airbag fabric which consists of synthetic filament yarns having a hot air shrinkage at 160° C. of at least 8% and has an at least essentially symmetrical set. To set the required air permeability, the fabric is subjected to a treatment in an aqueous bath at from 60° to 140° C. to initiate a process of shrinkage which leads to a further enhancement of the closeness of the weave. The subsequent drying of the fabric takes place at temperatures from 130° to 170° C. The fabric itself is uncoated and, unlike the fabrics already in use, acquires its ultimate properties only through the wet processing and hot air treatment.

The steps of shrinking, such as washing, heat setting, calendering and coating can be dispensed with in the case of the synthetic polyester yarn fabric known from EP-A-442,373. This fabric is composed of yarns having filament linear densities of not more than 4 dtex and yarn linear densities from 250 to 550 dtex. One advantage of this fabric is that its strength properties and its air permeability are already fixed at the weaving stage.

It is an object of the present invention to provide such a fabric with improved drapability and a suitable process for manufacturing it.

This fabric permits the manufacture of airbags having a soft drape, which have good folding and unfolding characteristics.

The present invention provides a process for producing uncoated woven fabrics from synthetic yarn for an airbag, comprising the measures of:

a) producing a woven fabric from high tenacity polyester filament yarn having a filament linear density of not more than 5 dtex, a yarn linear density within the range from 250 to 550 dtex, a hot air shrinkage at 200° C. of less than 9% and a boil off shrinkage of less than 2%, b) washing the fabric at temperatures of less than 60° C., and c) drying the washed fabric at temperatures of less than 170° C. under conditions so that the dimensions of the fabric, based on its dimensions prior to the washing step, do not change at all or by less than 2% in warp and weft direction, especially by treatment in a tenter with an overfeed of less than 2% and a widthways contraction of less than 2%.

As was surprisingly found, the use of a fine high tenacity polyester filament yarn having a filament linear density of 5 dtex or less and a yarn linear density within the range from 250 to 550 dtex creates without special fabric aftertreatment such as shrinking, heat setting or calendering an airbag fabric which has the requisite properties, especially a low air permeability, even without coating and rubberization. The fabric constructed according to the present invention is thus notable for the particular simplicity of its production. Owing to the absence of rubberization there is no danger of embrittlement, and this has a correspondingly favorable effect on airbag life. The specific choice of the filament material and of the washing and drying process according to the present invention lead to a close fabric which exhibits high drapability.

The filament linear density of the polyester yarn used according to the present invention is preferably less than 3.5 dtex, especially less than 3.0 dtex.

The yarn linear density of the polyester yarn used according to the present invention is preferably within the range from 300 to 500 dtex.

The low air permeability of the fabric constructed according to the present invention is especially due to the fine filament linear densities of the polyester warp and weft yarns. The fine yarn linear density leads to a low fabric weight and to a low fabric thickness. The basis weight of the fabric is preferably less than 250 g/m$^2$, while the fabric thickness is preferably less than 0.45 mm.

Preferably the polyester yarn used according to the present invention has a tenacity of more than 60 cN/tex and a breaking extension of more than 15%. A particularly good choice for manufacturing the fabric of the present invention is a polyethylene terephthalate yarn, for example the commercially available polyester yarn $^R$TREVIRA HIGH TENACITY from Hoechst AG.

The breaking strength of the fabric should preferably be more than 250 daN and the breaking extension of the fabric more than 22%, each based on a 5 cm wide strip of the fabric. These strength and extension values ensure that the fabric is suitable for absorbing the energy of the explosive expansion of the airbag.

The air permeability of the fabric of the present invention is preferably below 10 l dm$^{-2}$ min$^{-1}$ for the gastight portion and below 100 l dm$^{-2}$ min$^{-1}$ for the gas-permeable portion of the airbag, measured under a pressure difference of 500 Pa.

For the purpose of the present invention, the fabrics used can have a very wide range of weave constructions, for example a 1/1 plain weave. However, to modify the fabrics in a specific manner it may be preferable to employ variants, for example a rip stop weave, a cross twill weave, a crepe weave or a modified huckaback weave.

To obtain a very low air permeability, as is desirable especially for the jacket region of the airbag, the fabric should have a set of maximum closeness for the chosen yarn linear density and the chosen weave; that is, the fabric should have the maximum number of threads per unit length in warp and weft which can be woven.

A fabric with a 1/1 plain weave construction, for example in a 470 dtex polyester yarn, is advantageously set to 18 to 24 threads/cm, for example 22 threads/cm, in warp and weft.

To obtain the low air permeability, the number of threads/cm is correspondingly increased if the yarn linear density is lower and correspondingly decreased if the yarn linear density is higher.

The fabric properties are substantially fixed by the yarns used and the weaving process. The washing and drying process of the present invention then improves the drapability.

In a particularly preferred embodiment of the present invention, the fabric used has a rip stop weave and a set of maximum closeness. Such fabrics are suitable in particular for fabricating the airbag jacket.

It is further preferable here for there to be a multiple yarn every 3 to 15 mm. Of particular advantage is a spacing of about 4.5 to 5.5 mm between the multiple yarns and the choice of a double yarn as multiple yarn.

If the airbag has a gas-releasing fabric portion, the number of threads per unit length is reduced in accordance with the higher air permeability required. In contradistinction to the gastight portion, other weave constructions can be used in order that the slip resistance may be improved, for example cross twill or crepe weaves and modified huckaback weaves, as described in EP-A-509,399.

In a further refinement of the present invention, the fabric used comprises twisted warp yarns and zerotwist weft yarns. Such fabrics can be used in particular as the gastight (jacket) portion of airbags.

In a further refinement of the present invention, the fabric used comprises twisted warp yarns and twisted or zerotwist weft yarns. Such fabrics can be used in particular for the gas-releasing part of airbags.

The yarn twist is preferably within the range from 80 to 130 turns/m depending on the yarn linear density, for example about 90 turns/m in the case of a yarn linear density of 470 dtex.

The fabric to be used according to the present invention is produced using an unsized polyester yarn having a hot air shrinkage at 200° C. of less than 9%, preferably less than 7.5%.

As mentioned above, the fabric constructed according to the present invention requires no shrinking and heat setting. These measures are therefore omitted. Nor, having regard to the low fabric thickness, is any calendering required.

To enhance the drapability of the fabric and to obtain an appealing hand, the fabric is subjected to a low temperature washing and drying process.

The wash is carried out at temperatures of less than 60° C., preferably from 40° to 50° C.

The wash can be carried out with organic solvents or especially with water. The water may optionally contain detergent-active additives. The wash has the purpose in particular of removing from the fabric any spin finish residues still present on the yarns from their manufacture. The wash can be carried out using apparatus customary per se for open-width washing, for example continuous or open-width washers or else jiggers. Treatment times and, if used, additives are chosen so that the treated fabric is substantially free of spin finish.

In a particularly simple embodiment, the wash can also be replaced by a passage through water in a pad-mangle operating in overflow, in which case this pad-mangle usually immediately precedes the tenter and the spin finish does not have to be removed completely.

The wash is followed by a drying treatment. It involves drying the fabric at temperatures of not greater than 170° C., preferably at from 140° to 165° C. The drying has to be carried out in such a way that the dimensions of the loomstate fabric remain virtually unchanged or are virtually regained. For this purpose, the fabric is guided during the drying process in a tenter in such a way that virtually no overfeed and virtually no widthways contraction occur. For this the settings used are overfeed of less than 2% and a widthways contraction of less than 2%.

Particular preference is given to using an overfeed of from 0 to 1% and a widthways contraction of from 0 to 1%.

This can be done in any drying apparatus in which the width can be maintained, preferably on tenters.

Suitable tenters for carrying out the drying process are common knowledge. Such devices are described for example in Koch/Satlow "GroBes Textil-Lexikon", Deutsche Verlags Anstalt, under "Spannrahmen".

As observed above, the process of the present invention produces woven fabrics of excellent drapability. Drapability can be measured for example in terms of the bending length, which is measured in the bending stiffness test of DIN 53362. It was found for example that a 230 g/m$^2$ fabric treated according to the present invention has a bending length of not greater than 70/110 mm (warp/weft). The invention therefore also provides these fabrics and for their use for manufacturing airbags.

The bending length is determined according to DIN 53362 by placing a sample 25 mm in width and 250 mm in length which has been cut out straight with respect to the threads on a bending stiffness tester. The sample is then moved forward on the bending stiffness tester until it has become bent under its own weight to such an extent that its end comes into contact again with the chamfered side face of the tester. The bending length corresponds to the free length of the overhanging part of the sample.

The present invention further provides an airbag, especially an airbag with a gastight and a gas-releasing fabric portion which is constructed essentially of the above-described, uncoated and unrubberized and unsized and unset and preferably also uncalendered fabrics.

In a preferred embodiment of the airbag of the present invention, the gastight portion comprises a fabric with a set of maximum closeness, especially with a rip stop weave, and preferably with a multiple yarn every 3 to 15 mm. Of particular advantage is a spacing of about 4.5 to 5.5 mm between the multiple yarns and the choice of a double yarn as multiple yarn.

In a further preferred embodiment the gas-releasing portion comprises a fabric whose set is lower than that of the gastight portion and which preferably has a cross twill weave construction.

Preference is further given to those airbags of the present invention where the gastight fabric comprises twisted warp yarns and zerotwist weft yarns while the gas-releasing fabric comprises twisted warp and weft yarns.

Particularly preferred embodiments of the fabric and airbag of the present invention are those which comprise a combination of a plurality of the abovementioned preferred features.

The fabric of the present invention is produced by conventional weaving processes, specifically by interweaving a synthetic high tenacity polyester filament yarn having a filament linear density of 5 dtex or less and a yarn linear density within the range from 250 to 550 dtex.

Preference is given to using a polyester yarn having a tenacity of more than 60 cN/tex and a breaking extension of more than 15%.

It is further necessary for the polyester yarn used to have a hot air shrinkage at 200° C. of less than 9%, preferably less than 7.5%, and a boil off shrinkage of less than 2%.

It has further been found to be advantageous to use a 1/1 plain weave but preferably a rip stop weave for the gastight material and a cross twill weave for the gas-releasing material.

Advantages further result on setting the loom in such a way as to produce the further abovementioned preferred fabric parameters. The washing and drying process then improves the drapability while preserving the mechanical properties and the air permeability.

The manufacture of an airbag of the present invention which combines a gastight and a gas-releasing fabric portion is effected by joining together suitably trimmed lengths of fabric in a conventional manner and comprises using for the gastight portion a fabric as defined above with a set of maximum closeness and for the gas-releasing portion a fabric as defined above whose set is less than that of the gastight portion.

The manufacture of further, particularly preferred embodiments of the airbag according to the present invention is effected by using above-described fabrics which combine preferred properties, for example by using a gastight jacket fabric in a rip stop weave and a gas-releasing fabric in a cross twill weave.

EXAMPLE 1

An uncoated woven fabric for a driver airbag was produced using a 470 dtex 100 filament ®TREVIRA HIGH TENACITY polyester filament yarn. This yarn had the following properties:

| breaking strength | 8.1 daN |
|---|---|
| tenacity | 66.8 cN/tex |
| breaking extension | 21.5% |

-continued

| hot air shrinkage at 200° C. | 7.4% |
|---|---|
| melting point | 257° C. |

This yarn was woven up in a rip stop construction (5 mm) using 22/22 threads/cm, the warp comprising 470 dtex 100 filament ®TREVIRA HIGH TENACITY with 90 turns/m and a weft comprising 470 dtex 100 filament ®TREVIRA HIGH TENACITY with zero twist. Rip stop (5 mm) is a construction with a double thread incorporated in both warp and weft about every 5 mm.

The loomstate fabric had the following data:

| basis weight | 229 g/m$^2$ |
|---|---|
| thickness | 0.39 mm |
| breaking strength | 297 daN (warp) |
| (measured on a 5 cm wide strip) | 325 daN (weft) |
| breaking extension | 32% (warp) |
| (measured on a 5 cm wide strip) | 24% (weft) |
| tear resistance | 25 daN (warp) |
| (limb method of DIN 53356) | 24 daN (weft) |
| air permeability under 500 Pa | 6.6 l dm$^{-2}$ min$^{-1}$ |
| bending length | 88 mm (warp) |
| (measured according to DIN 53362) | 127 mm (weft) |

The above-described fabric was washed at 50° C. in a continuous open-width washer and then dried on a tenter at 160° C. without overfeed and widthways contraction. A more flexible and softer fabric was obtained without significantly altering the other properties of the fabric. This is shown by the following data:

| basis weight | 232 g/m$^2$ |
|---|---|
| thickness | 0.38 mm |
| breaking strength | 309 daN (warp) |
| (measured on a 5 cm wide strip) | 329 daN (weft) |
| breaking extension | 34% (warp) |
| (measured on a 5 cm wide strip) | 23% (weft) |
| air permeability under 500 Pa | 6.8 l dm$^{-2}$ min$^{-1}$ |
| bending length | 68 mm (warp) |
| (measured according to DIN 53362) | 108 mm (weft) |

What is claimed is:

1. A process for producing uncoated woven fabrics from synthetic yarn for an airbag, comprising the steps of:
   a) producing a woven fabric from high tenacity polyester filament yarn having a filament linear density of not more than 5 dtex, a yarn linear density within the range from 250 to 550 dtex, a hot air shrinkage at 200° C. of less than 9% and a boil off shrinkage of less than 2%,
   b) washing the fabric at a temperature of less than 60° C., and
   c) drying the washed fabric at a temperature of less than 170° C. under conditions so that the dimensions of the fabric, based on its dimensions prior to the washing step, do not change at all or by less than 2% in warp and weft direction.

2. The process of claim 1 wherein the drying of the washed fabric takes place by treatment in a tenter with an overfeed of less than 2% and a widthways contraction of less than 2%.

3. The process of claim 1 wherein the high tenacity polyester filament yarn has a tenacity of more than 60 cN/tex and a breaking extension of more than 15%.

4. The process of claim 1 wherein the high tenacity polyester filament yarn used for producing the woven fabric is size-free.

5. The process of claim 1 wherein the high tenacity polyester filament yarn used for producing the woven fabric comprises twisted warp yarns and twisted or zero twist weft yarns.

6. The process of claim 5 wherein the high tenacity polyester filament yarn used for producing the woven fabric comprises twisted weft yarns.

7. The process of claim 6 wherein the twist level of the high tenacity polyester filament yarn is within the range from 80 to 130 turns/m.

8. The process of claim 1 wherein the woven fabric produced has an air permeability of below 100 l dm$^{-2}$ min$^{-1}$, measured under a pressure difference of 500 Pa.

9. The process of claim 8 wherein the woven fabric produced has an air permeability of below 10 l dm$^{-2}$ min$^{-1}$, measured under a pressure difference of 500 Pa.

10. The process of claim 1 wherein the woven fabric produced has a basis weight of less than 250 g/m$^2$ and a thickness of less than 0.45 mm.

11. The process of claim 1 wherein the woven fabric produced has a breaking strength of more than 250 daN and a breaking extension of more than 22%, both measured on a 5 cm wide strip of the fabric.

12. The process of claim 1 wherein the washing temperature is from 40° to 50° C.

13. The process of claim 1 wherein the washing step includes washing with a liquor that comprises water with or without detergent-active additives.

14. The process of claim 1 wherein the drying temperature is from 140° to 170° C.

15. The process of claim 1 wherein the drying of the washed fabric takes place under conditions so that the dimensions of the fabric, based on its dimensions prior to the washing step, are reduced by from 0 to 1% in warp and weft direction.

16. The process of claim 2 wherein the overfeed is from 0 to 1% and the widthways contraction from 0 to 1%.

17. An uncoated woven fabric obtained by the process of claim 1.

18. The fabric of claim 17 wherein the high tenacity polyester filament yarn has a tenacity of more than 60 cN/tex and a breaking extension of more than 15%.

19. The fabric of claim 17 wherein the high tenacity polyester filament yarn is size-free.

20. The fabric of claim 17 wherein the high tenacity polyester filament yarn comprises twisted warp yarns and twisted or zero twist weft yarns.

21. The fabric of claim 20 wherein the high tenacity polyester filament yarn comprises twisted weft yarns.

22. The fabric of claim 20 wherein the twist level of the high tenacity polyester filament yarn is within the range from 80 to 130 turns/m.

23. The fabric of claim 17 having an air permeability of below 10 l dm$^{-2}$ min$^{-1}$, measured under a pressure difference of 500 Pa, and a plain or rip stop construction.

24. The fabric of claim 17 having an air permeability below 100 l dm$^{-2}$ min$^{-1}$, measured under a pressure difference of 500 Pa, and a cross twill construction, a crepe construction or a modified huckaback construction.

25. The fabric of claim 17 having a basis weight of less than 250 g/m$^2$ and a thickness of less than 0.45 mm.

26. The fabric of claim 17 having a breaking strength of more than 250 daN and a breaking extension of more than 22%, both measured on a 5 cm wide strip of the fabric.

27. An airbag comprising the uncoated woven fabric as claimed in claim 17.

28. The airbag of claim 27 comprising at least one gastight fabric portion, the gastight fabric portion comprising a fabric with a plain weave or a rip stop weave and a set of maximum closeness.

29. The airbag of claim 27 comprising at least one gastight fabric portion comprising twisted warp yarns and zero twist weft yarns.

30. The airbag of claim 29 comprising a gastight and a gas-releasing fabric portion, the gas-releasing fabric portion comprising twisted warp and weft yarns.

* * * * *